Aug. 7, 1928.

L. J. BROWN 1,679,403

QUICK TAKE-UP AND RELEASE HAND BRAKE FOR RAILROAD CARS

Filed July 21, 1925

Inventor
Lloyd J. Brown
By
Attorney

Patented Aug. 7, 1928.

1,679,403

UNITED STATES PATENT OFFICE.

LLOYD J. BROWN, OF EVANSTON, ILLINOIS, ASSIGNOR TO E. PAYSON SMITH, OF CHICAGO, ILLINOIS.

QUICK TAKE-UP AND RELEASE HAND BRAKE FOR RAILROAD CARS.

Application filed July 21, 1925. Serial No. 45,049.

The hand brake commonly used on railroad cars includes a ⅜-chain winding around a brake staff of 1½" diameter, consequently it cannot give a quick take up nor a quick release. The amount of power it gives is approximately 1600 lb. pull on the brake chain.

A ruling by the American Railway Association, effective March 1, 1925, requires new freight cars, and cars rebuilt after March 1, 1925, shall have a hand braking power that a force of 125 lbs. at the rim of the brake wheel or three inches from the outer end of the hand brake ratchet lever will develop an equivalent load at the brake cylinder piston of not less than 2500 lbs. and 3950 lbs., respectively, for cars having an 8 inch and 10 inch cylinders. In other words, the rule means that the new hand brake must be equal to the air brake as the figures mentioned is the capacity of the air brake for the respective size cylinders mentioned.

The object of my invention is to amplify the power applied at the hand wheel, or ratchet lever, by the trainman, equivalent to the power of the air brake.

A further object of my invention is to provide in a hand brake of this kind, a quick take up, power, and a quick release from applied or set position.

Theoretically, the power transmitted by my improved gear mechanism is double that required in order to fully compensate for the large percentage of loss of power due to friction and other causes before its output.

Another object of my invention is to take up quickly and immediately the slack in the brake chain, after which the ratio is reversed and power increased so that it is constantly equivalent to the pressure of the lever at the air brake cylinder with air pressure, or a minimum of 3950 lbs., so that the car can be gotten under control in a short distance of travel and keep it under control and stop it at the required location.

A further object of my invention is to provide a gearing which permits of change from 1 to 1 ratio to a 5 to 1 ratio, or other effective ratio.

My invention consists of the parts and combination of parts as will be hereinafter set forth.

Figure 1:
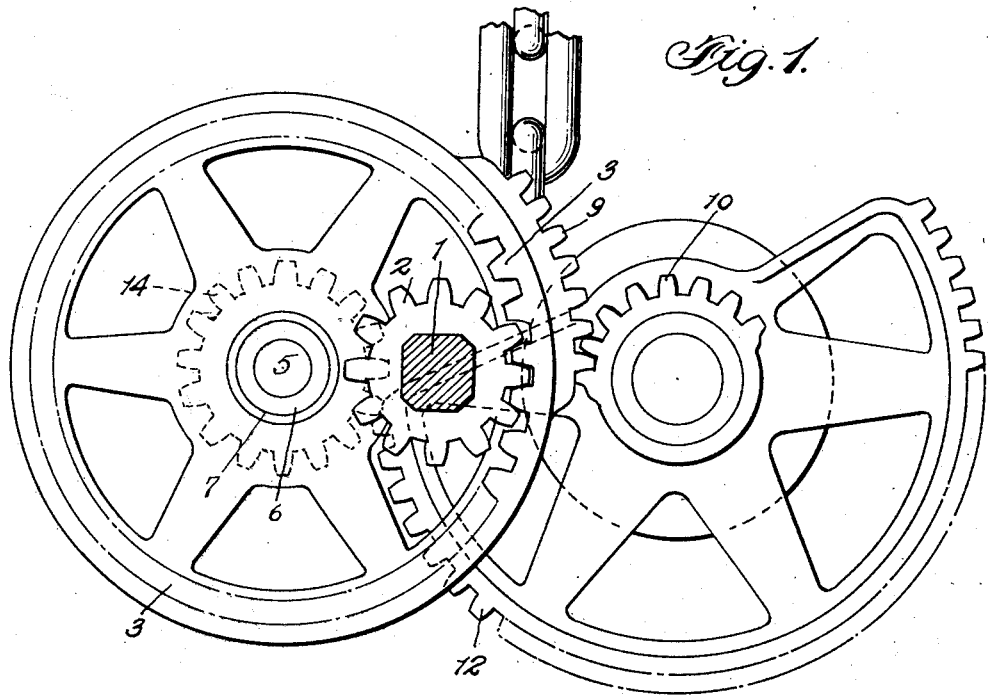
Figure 1 is a top plan view of gearing embodying my invention.
Figure 2:
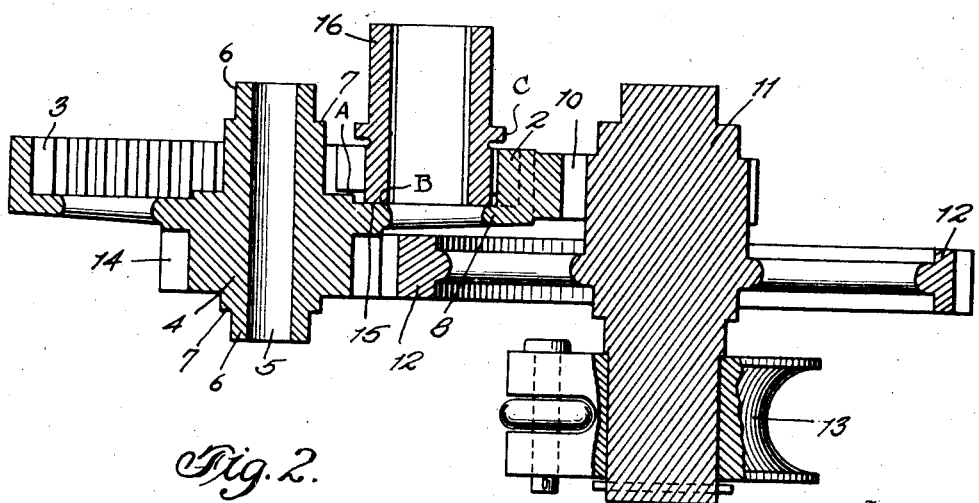
Figure 2 is a vertical section through the same.

The reference number 1 designates the usual brake staff, or ratchet lever of any approved type to which is keyed the pinion 2, which is in mesh with the annular gear 3, at all times, said gear 3 having a suitable hub 4 which is mounted in suitable bearings in a housing as will be hereinafter described; the hub has a core 5 and has reduced bearings 6 at each end terminating in shoulders 7.

I have provided means to prevent the pinion 2 from disengaging, or working away, from the internal gear 3 when force is applied, which means consists of a raised portion or boss A cast around the hub of the gear 3, and a corresponding boss B is cast on the bottom face of the pinion 2, so that when these parts are assembled the boss A on the gear 3 acts as a stop against the boss B on the pinion 2 and helps to hold it in place.

The shoulder C on the pinion hub 16, sets up against a suitable housing, such as is used for brake gears and this shoulder prevents the pinion from working up out of place. A long bearing 16 is provided for the pinion 2 for the reason that it is supported only on the top and it must of necessity be held firmly. In order to help the firmness or rigidity of the structure, the recess formed by the shoulder A is provided whereby some of the strain is transmitted to the shoulder 7 in the hub of the annular gear 3. The lug 8 also functions as a seat for the pinion 2.

The annular gear 3 is provided with external teeth 9 on its periphery which are in mesh at the beginning of the operation with the teeth of the small segmental gear 10, which gear 10 is cast integral with the shaft or hub 11 of the large segmental gear 12, and the chain drum or sheave 13 is attached to the shaft 11.

The teeth of the segment 10 and the teeth 9 remain in mesh until the quick take up of the slack in the chain is completed, when and at which time the large segmental gear 12 comes into mesh with the pinion or spur gear 14, which pinion is below the gear wheel 3 and integral with the hub or shaft 4.

When the quick take up operation is completed and the segmental gear 12 goes into mesh with the spur or pinion 14, the gearing then goes into condition of maximum power, which means that full power can be applied at this point of the operation or any succeeding points, or as soon as the brake shoes are in taut position against the car wheel.

It will be noted that a seat 15 is formed on the hub or shaft 4 on which the hub 16 of the pinion 2 rests.

When cars are built new, or rebuilt, there is from 3½ to 4 inches of slack in the brake chain. This is considered an ideal condition and one that the railroads like to maintain. The quick take up feature of my brake is designed to permit of this condition and to take up approximately 4 inches of chain and lever slack before going into power. After cars are in service for some months brake shoes wear, brake chains stretch, brake levers, rods, and all connections wear, all of which conditions give more slack in brake chain and connections. When this condition occurs there is more than 4 inches of slack in chain and brake connections which necessitates travel in maximum power condition until all slack is taken up and during which time the gearing or brake develops the maximum power ratio and continues to do so until the brakes are in full set position.

It is necessary in a hand brake gearing that the quick release feature operate as effectively as the quick take up feature when the brakes are released from a set position.

When starting release, the spur gear 14 and the segmental gear 12 being in mesh to accomplish power are in a tense position due to braking power (required by American Railway Association interchange regulations) on brake shoes. When the brake ratchet is released this tension will immediately throw the segmental gear 9 and the segmental gear 10 into mesh thereby accomplishing quick release.

It will be noted that the segmental gears 9 and 10 perform only the function of quick take up and quick release as the power ratio of these gears is low.

On the large segmental gear 12 at total release there is an odd sized tooth which acts as a stop and prevents the quick take up and quick release (gears 9 and 10) from going out of mesh.

The gearing will be enclosed in a suitable housing to protect it from the elements and to prevent the body and clothing of the trainmen from coming in contact with any of the gears. This housing will provide bearings for the several shafts of the gearing to hold the gearing in proper alignment when power is applied.

What I claim is:

1. A quick take up gear for car brakes including a comparatively large interrupted gear wheel, a segmental gear on the shaft of said wheel but in a different plane from said wheel, an internally toothed gear, a segmental gear on the periphery of said internal toothed gear adapted to mesh with the first named segmental gear, a driving pinion meshing with the internal gear, a spur gear on the shaft of the internal gear and meshing with the interrupted gear wheel.

2. A quick take up gear including a shaft, an internally toothed gear on said shaft, a segmental gear on the periphery of said gear, a pinion on said shaft below said gear, a second shaft connected with the brake staff, a pinion on said second shaft meshing with the internal tooth gear, a third shaft, an interrupted gear on said third shaft and meshing with the first named pinion, and a segmental gear on said third shaft but in a different plane from the interrupted gear, and adapted to mesh with the segmental gear on the internally toothed gear.

3. A quick take up gear including a shaft, an internally toothed gear on said shaft, a segmental gear on the periphery of said gear, a pinion on said shaft below said gear, a second shaft connected with the brake staff, a pinion on said second shaft meshing with the internal tooth gear, a third shaft, an interrupted gear on said third shaft and meshing with the first named pinion, and a segmental gear on said third shaft but in a different plane from the interrupted gear, and adapted to mesh with the segmental gear on the internally toothed gear, and a chain drum on said third shaft.

4. A car brake including a comparatively large gear, a seat on said gear, and a brake staff pinion mounted on said seat and means on the pinion to prevent it riding up on the teeth of said large gear.

5. A quick take up and quick release hand brake for cars, comprising a shaft, an internally toothed gear wheel on said shaft, a segmental gear on the periphery of said gear wheel, a pinion on said shaft below the said gear wheel, a second shaft, a pinion on said shaft meshing with the internal teeth of said gear wheel, said second shaft being adapted to be secured to a brake staff, a third shaft, a comparatively large interrupted gear on said third shaft and adapted to mesh with the pinion on the first named shaft, a segmental gear on the third shaft positioned above the interrupted gear and in the zone of interruption of said gear, and adapted to mesh with the segmental gear on the periphery of the internally toothed gear, and a chain drum on said third shaft.

In testimony whereof I affix my signature.

LLOYD J. BROWN.